United States Patent [19]

Eastin

[11] 4,435,201

[45] Mar. 6, 1984

[54] MANUFACTURING AND USING NITROGEN FERTILIZER SOLUTIONS ON A FARM

[76] Inventor: John A. Eastin, P.O. Box 389, Lincoln, Nebr. 69140

[21] Appl. No.: 379,466

[22] Filed: May 18, 1982

Related U.S. Application Data

[60] Continuation-in-part of Ser. No. 100,825, Dec. 6, 1979, abandoned, which is a continuation of Ser. No. 824,289, Aug. 15, 1977, abandoned, which is a continuation of Ser. No. 728,788, Oct. 1, 1976, abandoned, which is a division of Ser. No. 581,050, May 27, 1975, abandoned.

[51] Int. Cl.³ .............................................. C05C 3/00
[52] U.S. Cl. .......................................... 71/54; 71/59; 71/64.1; 423/397
[58] Field of Search ...................... 71/1, 37, 39, 43, 49, 71/50, 53, 54, 56, 57, 58, 59, 60, 61, 63, 64.1; 423/359, 395, 403, 397

[56] References Cited

U.S. PATENT DOCUMENTS

| | | | |
|---|---|---|---|
| 2,088,869 | 8/1937 | Porter | 71/54 |
| 2,936,548 | 5/1960 | Morrison | 71/1 X |
| 3,888,652 | 6/1975 | Yie et al. | 71/64.1 X |

Primary Examiner—Ferris H. Lander
Attorney, Agent, or Firm—Vincent L. Carney

[57] ABSTRACT

To make and use nitrogenous fertilizer on a farm, nitrogen dioxide is prepared in a continuous process from air or from ammonia in a reactor, with the ammonia either being transported to the farm or being prepared on the farm in a continuous process from water and air. The nitrogen dioxide is mixed with a continuous flow of water to form a dilute solution of nitric acid, which may be applied to the field through the irrigation system as top dressing or mixed within the irrigation system with ammonia or other cations to form ammonium nitrate or other desired nitrogen solutions for application to the fields in a continuous process or concentrated without requiring storage of large amounts of gas or creating heat exchange problems in the manufacturing process. In the embodiment which burns ammonia, the nitrogen oxides are fixed on an 8 percent nickel stainless steel mesh in a column 10 feet high and one foot in diameter and oxidized while fixed to nitrogen dioxide. The nitrogen dioxide is dissolved in water flowing through the mesh.

6 Claims, 4 Drawing Figures

MANUFACTURING AND USING NITROGEN FERTILIZER SOLUTIONS ON A FARM

RELATED CASES

This application is a continuation-in-part of U.S. application Ser. No. 100,825 to John Eastin filed Dec. 6, 1979, on MANUFACTURING AND USING NITROGEN SOLUTIONS ON A FARM, which is a continuation of Ser. No. 824,289 filed Aug. 15, 1977, which is a continuation of Ser. No. 728,788, filed Oct. 1, 1976 which is a division of Ser. No. 581,050, filed May 27, 1975, all now abandoned.

BACKGROUND OF THE INVENTION

This invention relates to methods and apparatus for producing nitrogen fertilizer solutions.

It is known that ammonium and nitrate ions are the major nitrogen forms absorbed by plant roots. It has been described in *Biological Review*, 1978. 55:465-510, that each ion may produce different yield and physiological responses within plant and cropping systems. Moreover, certain common crops and categories of different crops respond to different ratios of the two ions in the soil solution by providing increased plant growth and yield when the proper ion ratio exists in the soil solution during the crop growth period. For example, corn grows most rapidly with 1:3 ammonium:nitrate ion ratio in a normal temperature soil solution while tomatoes grow most efficiently with a large preponderance of nitrate nitrogen in the soil solution.

It is thus known to be beneficial to apply nitrate fertilizers to crops and to exercise control of the ammonium:nitrate ion ratio in the soil solution of a particular crop in accordance with that crop's needs.

The nitrogen fertilizer industry, in most countries, uses anhydrous ammonia as a principal component. This is because anhydrous ammonia: (1) has relatively low initial cost; (2) is the raw material for other synthetic nitrogen fertilizers; (3) has high nitrogen content, the content being approximately eighty-two percent (82%) by weight; and (4) has physical characteristics which make long distance pipeline, rail and truck transport efficient.

Anhydrous ammonia is a liquefied gas and because of that it has the several disadvantages under some circumstances, such as: (1) requiring special storage and handling facilities which are so expensive as to limit storage of anhydrous ammonia at the farm level and the local retail level; (2) requiring specialized subsurface application equipment to avoid ammonia loss at application time; (3) not being suitable for application in irrigation waters because it results in calcium carbonate deposits in the irrigation equipment and prohibitive amounts of fertilizer nitrogen are lost to the atmosphere through volatilization; (4) the time during a cropping season when it can be applied is limited because of the subsurface application requirements; and (5) because it must be applied at certain times, logistical problems and economic burdens are created in the industry.

One of the economic problems occurs because many soils, and especially coarser irrigated soils, cannot hold enough nitrogen applied as a single preplant ammonia application to sustain economic crop yields. Thus, it is necessary to apply split applications of nitrogen fertilizer. The time during the crop cycle when ammonia can be side dressed as a split application is limited by the growth of the crop plants because the operation requires knifing the ammonia gas into the soil.

It is known to use non-pressure nitrogen solutions to reduce some of these difficulties because they adapt readily to simple handling, storage and application methods. Moreover, the application of non-pressure fertilizer nitrogen solutions can be accomplished in concert with crop needs and this elicits a better crop growth response for each unit of applied nitrogen than the normal method of applying nitrogen in a concentrated ammonia band in the soil at the beginning of or shortly after the start of a crop cycle.

Non-pressure nitrogen solutions can be applied to the crop as a top dressing mechanically or in water used to irrigate the crop so it can be applied in a practical manner as the crop needs nitrogen.

However, non-pressure nitrogen solution fertilizers manufactured and applied by prior art techniques have a disadvantage in that a delivered unit of nitrogen as non-pressure nitrogen solution costs nearly double that for nitrogen as anhydrous ammonia. There have been many prior art attempts to reduce the cost of non-pressure nitrogen solutions.

In the prior art, one commercial system for providing non-pressure nitrogen fertilizer solutions for farm use consists of producing a relatively concentrated ammonium nitrate solution and blending it with a urea solution for shipment to dealers with subsequent distribution to and use at the farm level. The normal solution sold to the farmer contains from 28% to 32% nitrogen by weight, which is a low concentration product for long distance transportation. It must also be handled through a multi-tier distribution system.

The ammonium nitrate solution is produced by oxidizing ammonia with air, in the presence of a catalyst, to nitrogen oxide, oxidizing the nitrogen oxide to nitrogen dioxide and absorbing the nitrogen dioxide in water to produce nitric acid. In some prior art embodiments, this process is carried out at high pressure to make the desired acid concentration and reduce the size of the nitrogen oxide conversion and absorption system. Some systems include 30 to 35 stages of oxide conversion and absorption. In some systems, the concentrated nitric acid is reacted with ammonia to form an ammonium nitrate solution.

These commercial processes have the disadvantages of: (1) being expensive; (2) having considerable air pollution hazard; and (3) resulting in an expensive product. The cost of the product is increased for several reasons, such as: (1) the cost of making concentrated nitric acid and concentrated urea solutions is high; (2) there is cost in controlling atmospheric pollution; (3) there are substantial raw material losses in the manufacturing process; and (4) transporting and distributing a low concentration 28% to 32% nitrogen product over long distances to market is expensive.

In another prior art process, nitrogen is separated from the exhaust of tractors or other engines on a farm and the nitrogen is used as top dressing or for combination with other materials to form nitrogenous fertilizers. These processes are described in U.S. Pat. Nos. 2,943,419, 2,947,112 and 3,099,898.

These processes have the disadvantages of: (1) being limited in the amount of fertilizer obtainable; (2) being obtainable at only certain times; (3) producing undesirable nitrite nitrogen in the end product; (4) being limited in capacity to produce specific fertilizer nitrogen forms for cropping situations where that is desired; (5) being limited in the amount of fertilizer that can be produced economically by the amount of exhaust available from tractors or other engines while they are used for other purposes and being obtainable only after such use unless fuel is wasted by using the tractors or engines only to produce exhaust; and (6) requiring expensive and complicated apparatus effect their reduction to practice.

Still another prior art process uses a multi-purpose irrigation-hydroelectric project as: (1) a base for manufacturing nitrogen solution fertilizer; (2) a vehicle for delivering said fertilizer to farms; (3) a means for correcting soil and water alkalinity problems of irrigated farms with nitrogen fertilizer; and (4) a means of fertilizing irrigated crops with nitrogen fertilizer.

The hydroelectric power not used for normal community use is used to prepare ammonia in a conventional manner. The ammonia is then partially oxidized, the remainder of the gas stream is mixed with the oxides formed in the partial oxidation and the mixture is absorbed in water to make a nitrogen solution fertilizer. Alternatively, electricity is used to make nitrogen oxides by the electric arc process and the oxides of nitrogen treated to make a nitrogen solution fertilizer. This process is described in U.S. Pat. Nos. 2,028,172 and 2,088,869.

This process has the disadvantages of: (1) not being suitable for use on individual farms or local sites serving only a few farms and thus being limited in application; (2) causing some damage in use; and (3) being inefficient in several respects.

Firstly, the process of U.S. Pat. Nos. 2,028,172 and 2,088,869 is not suitable for use on individual farms or local sites serving only a few farms and thus is limited in application for several reasons such as: (1) it is applicable only to large-scale, multi-purpose irrigation-hydroelectric projects; (2) it requires large-scale, multi-purpose dam sites for water and power and thus consideration of too large a number of individual farm's separate needs; (3) it does not permit practical tailoring of the ions produced to specific crop needs unless the same crop is used over a wide area which causes difficulties with diseases and insects; and (4) it requires the handling and conversion of nitrogen oxides at a central irrigation-hydroelectric dam site.

Secondly, the process of U.S. Pat. Nos. 2,028,178 and 2,088,869 causes damage in use because: (1) it causes extensive groundwater pollution; (2) it requires the transportation in open ditches of corrosive and environmentally dangerous materials over long distances; and (3) it produces nitrites in the end product in concentrations that are harmful when applied to crops.

Thirdly, the process of U.S. Pat. Nos. 2,028,178 and 2,088,869 is inefficient because: (1) it has large fertilizer losses in transit; (2) it provides a low yield of usable nitrate ions; (3) it converts oxides to nitrates in (a) conventional trickle towers which are large if operated at atmospheric pressure or expensive if operated at conventional high pressure; (b) turbine infall or outfall which results in prohibitive nitrogeneous raw material losses in the form of nitrogen oxides gas loss to the atmosphere; or (c) irrigation ditches which results in high levels of nitrite ions and the high loss of nitrogenous gases to the atmosphere; and (4) it has a low yield of usable nitrogen fertilizer compounds from the initial manufacturing process because the means taught for rationing of ammonia to nitric nitrogen in consonance with the relative alkalinity or acidity of water or soil is by controlling the proportion of ammonia which is oxidized.

In the last case, the effluent gases from the oxidizing catalyst comprise the desired mixture of ammonia-nitric-oxide-oxygen-inert gases which gas mixture is then cooled and passed into a trickle tower or otherwise brought into contact with the water or a portion of the water to be utilized for irrigation.

This process has the disadvantage of resulting in large proportion of the ammonia and nitric oxide produced by the process being converted to inert nitrogen gas and water, thus making the process yield so low as to be impractical. The approach was apparently selected because it would interface conveniently with the inherent characteristics of a hydroelectric-irrigation project.

Because the decomposition of ammonium nitrite is an ionic reaction in which the ammonium ion combines with the nitrite ion to form gaseous nitrogen as a product, scrubbers or sources of turbulence designed to remove nitrogen oxides from gas streams or to form ammonium nitrate and ammonium nitrite using ammoniated liquids suffer substantial raw material loses by decompositions of ammonium nitrite in this manner, especially at higher oxide concentrations because they generally operated at too low pH's.

The multi-purpose irrigation-hydroelectric projects are necessarily large-scale (U.S. Bureau of Reclamation, Reclamation Project Data; historical, technical and statistical information on reclamation projects; U.S. Government Printing Office 1948) with each project serving as a minimum approximately 20,000 acres and generally substantially more than 50,000 acres of farmland. They are restricted as to general usefulness because they must use large-scale, multi-purpose dam sites for water and power, thereby requiring the consideration of a large number of individual farmer's separate needs in the fertilizer management thus making the project unmanageable.

Such projects are useful only for large-scale applications and therefore do not permit practical tailoring of the ions produced to specific crop needs unless the same crop is used by many farmers over a wide area in the irrigation district. However, this results in agronomic difficulties with diseases and insects.

Such projects have the disadvantages of: (1) requiring the handling and conversion of nitrogen oxides at a central irrigation-hydroelectric dam site as contrasted to processing in a small locality or on a farm where the control is necessary for agronomic and economic success; (2) causing extensive ground water pollution by requiring the transport of nitrogen fertilizer to farms in district irrigation canals; (3) requiring the transportation of corrosive and environmentally dangerous materials over long distances to farms in open ditches; (4) causing losses of nitrogen fertilizer in delivery to the farm that are economically prohibitive; and (5) having a yield of usable nitrate ions that is low.

This system produces nitrites in the end product in concentrations that would be harmful when applied to crops unless conventional trickle towers, which to be efficient are large in size if operated at atmospheric pressure and require expensive construction and maintenance if operated at conventional high pressure, are used for oxidation to nitrate. Trickle towers normally have 30 to 35 stages for operation at atmospheric pressure. The use of turbine infall or outfall for oxidation conversion results in prohibitive nitrogenous raw material losses in the form of nitrogen oxide gas loss to the atmosphere.

SUMMARY OF THE INVENTION

Accordingly, it is an object of the invention to provide a novel method for nitrogenous fertilization of crops.

It is a further object of the invention to provide a novel apparatus for nitrogenous fertilization of crops.

It is a still further object of the invention to provide an inexpensive method and apparatus for applying substantial amounts of nitrogen fertilizers to crops.

It is a still further object of the invention to provide an inexpensive method and apparatus for manufacturing on the farm, substantial amounts of nitrogen fertilizer solutions in concentrations practical for farm storage and use.

It is a still further object of the invention to provide a novel fertilizing technique in which the fertilizers are primarily manufactured on the farm where used.

It is a still further object of the invention to provide a novel fertilizing system in which the synthesis of the fertilizer and the application of the fertilizer are done in continuous processes using dilute amounts of materials.

It is a still further object of the invention to provide a fertilizing system which does not require the storage of toxic or explosive gases or materials in substantial amounts or for long periods of time.

It is a still further object of the invention to provide a system for manufacturing and using nitrogen fertilizers in solution to avoid storage of toxic or explosive gases.

It is a still further object of the invention to provide a manufacturing and fertilizing system for irrigated crops whereby the ratio of ammonium to nitrate ions in the soil solution can be controlled between the values of 50:50 and 0:100 as desired and thereby enhance crop yields.

It is a still further object of the invention to provide a method of manufacturing nitric acid and ammonium nitrate solutions in practical concentrations whereby nitrogen oxide pollution of the atmosphere is eliminated without additional expense in the manufacturing process.

In accordance with the above and further objects of the invention, nitrogen dioxide is prepared from air in an electric operation known in the art or prepared from ammonia by passing the ammonia through a catalytic reactor. The ammonia may be purchased at relatively low cost or may be synthesized in a catalytic converter from hydrogen obtained by the electrolysis of water and nitrogen separated from the air, all of which may be done in a continuous process.

On irrigated farms, the nitrogen dioxide is applied in an absorber to water flowing through the irrigation system to form a dilute nitric acid solution on the farm. The nitric acid is either applied as a top dressing or neutralized with a fertilizer cation, the cation amount and type being selected to meet crop requirements. For example, the nitric acid may be mixed with ammonia or potassium compounds to form nitrogenous fertilizers such as ammonium nitrate or potassium nitrate for application to crops.

For non-irrigated farms and irrigated farms desirous of using concentrated nitrogen fertilizer using conventional application methods, the nitric acid formed in the absorber is circulated to a nitrogen solution storage tank and back to the absorber. As the solution flows to the absorber, ammonia is metered into the flowing solution at a rate so as to produce an acid ammonium nitrate solution. A heat exchanger is placed in the process subsequent to neutralization to cool the solution. The circulation process is continued until an ammonium nitrate solution of the desired strength is produced. Where desired another fertilizer cation can be substituted for ammonia at the neutralization step.

The absorber is a vertical cylindrical column between 5 feet high and 15 feet high, with a diameter of between nine and 18 inches. It is filled except for a space at the top and bottom with a solid catalyst having surfaces with different attractions to nitrogen and oxygen such as an 8 percent nickel stainless steel mesh. To mix the oxides and water, water flows into the top space at a rate of between 5 gallons for each minute and 20 gallons for each minute to provide an output of nitrogen fertilizer liquid. The oxides mixed with bleach air enter the bottom space.

The nitrogen oxides are attached to sites on the catalyst and oxidized to nitrogen dioxide by the air. The nitric oxide is held to the catalyst by forces sufficiently strong so it is not removed by the water and is oxidized in place to nitrogen dioxide. The nitrogen dioxide reacts with water to form nitric acid and is washed to the bottom of the column.

Since the gases that are generated in each of the above processes are dissolved in water in the continuous process without storing them as gases, the cost of the process is reduced.

This system for nitrogenous fertilization is relatively inexpensive and safe for several reasons, such as: (1) it does not require storage or handling of large amounts of ammonia, nitric acid, nitrogen, hydrogen or the like; (2) it does not require storage of the fertilizer solution itself by a manfacturer prior to shipment to a number of different dealers and farms; (3) it does not require the expensive long-distance transportation of finished fertilizer to dealers and to farms; (4) the use of commercial ammonia can be spread over a crop season instead of requiring use at a peak period while the benefits of using nitrogen solutions with low raw material costs are realized; (5) it requires the farmer only to buy the relatively inexpensive ammonia or to utilize inexpensive processes in forming nitrogen dioxide or of forming ammonia, which processes and materials are less expensive than the fertilizer itself; (6) it does not require storage of large quantities of fertilizer on the farm prior to use; (7) the fertilizers can be manufactured and supplied in sufficient quantities when needed; (8) heat from exothermic reactions is easily and safely dissipated because of process size and continuity; (9) the synthesis of concentrated nitric acid is not necessary, thus the nitrogen dioxide formation and absorption can be carried out at atmospheric pressure at cost savings over normal commercial processes; and (10) nitrogen oxide pollution is eliminated because absorption is carried out in cool water, at atmospheric pressure and low nitric acid concentrations.

SUMMARY OF THE DRAWINGS

The invention and other features thereof will be better understood from the following detailed description when considered with reference to the accompanying drawings in which.

SPECIFIC DESCRIPTION

Figure 1:
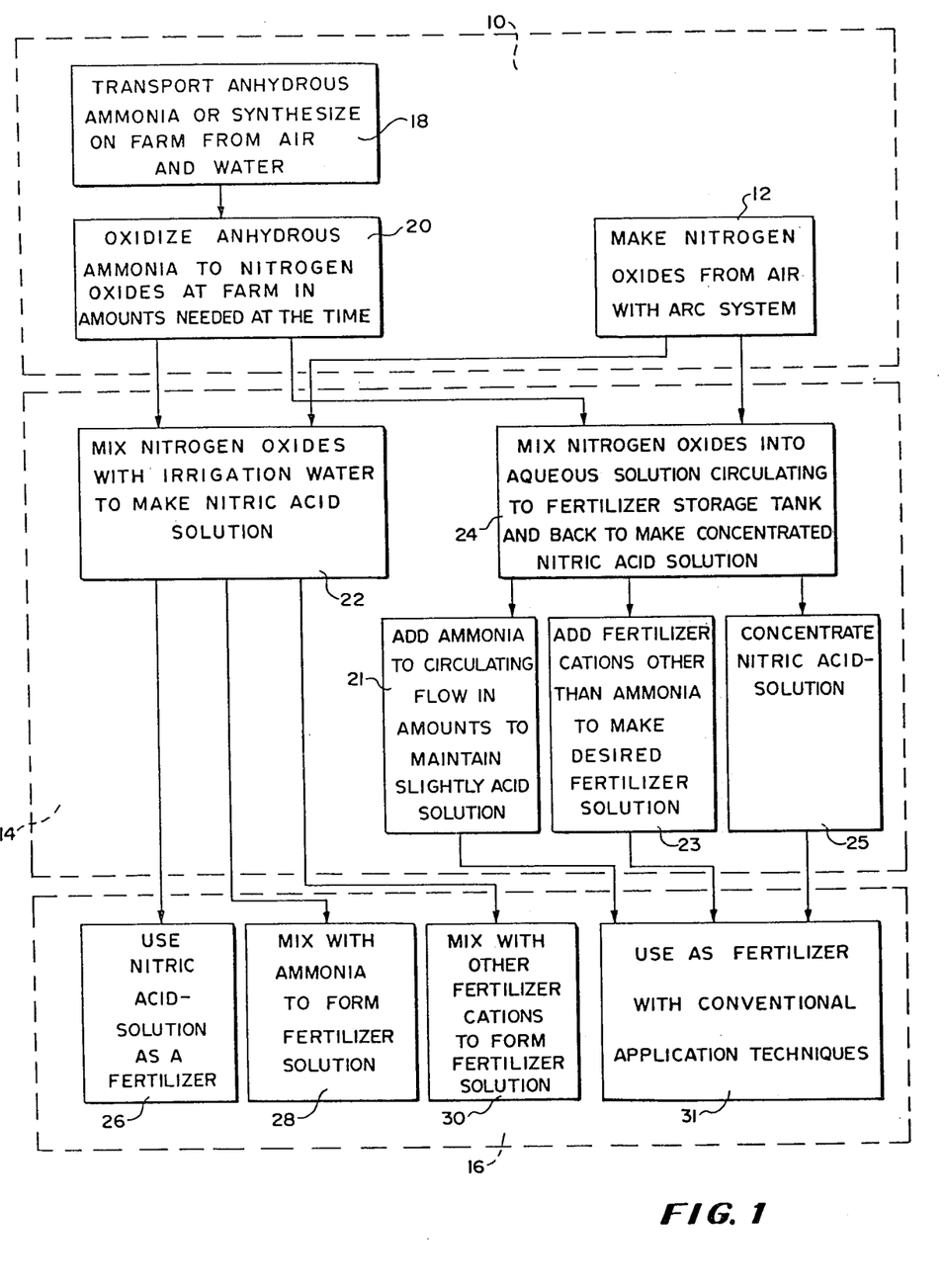
FIG. 1 is a flow diagram of a system for preparing and using nitrogenous fertilizer in accordance with the invention.

In FIG. 1, there is shown a flow diagram of the novel process for nitrogenous fertilizing of agricultural land having two alternate processes 10 for forming nitrogen oxides, two alternate processes 14 for converting the nitrogen oxides into nitrogen compounds susceptible of nitrogen fixation by vegetation and any of several alternate steps 16 for utilizing the nitrogen compounds formed in process 14.

One series of steps for forming nitrogen monoxide and nitrogen dioxide includes the first step 18 of either transporting anhydrous ammonia to the farm or synthesizing anhydrous ammonia from nitrogen and hydrogen on the farm. Either of the steps are accomplished as the fertilizer is needed so that it is not necessary to store large amounts of anhydrous ammonia.

The second step 20 in forming the nitrogen oxides is to oxidize the anhydrous ammonia on the farm into nitrogen oxides in a continuous process in the amounts needed at that time for forming the fertilizer. The oxidation takes place at atmospheric pressure and substantially concomitantly with downstream fertilizer solution formation and application to the farmland. Consequently, it is not necessary to handle the nitrogen oxides under pressure or store the nitrogen solutions in large quantities. A process suitable for such oxidation is disclosed in U.S. Pat. No. 3,660,024.

The alternate step 12 for forming the nitrogen oxides includes the preparation of nitrogen monoxide from air using an electric arc in a process well known in the art and the synthesis of nitrogen dioxide from the nitrogen monoxide prepared in the first step together with oxygen which may be from the air or from another source of pure oxygen in an electric arc.

The nitrogen oxides formed by either of the series of steps indicated at 10 are then utilized in one of the alternate processes 14 to prepare a nitric-acid nitric-oxide solution which continually flows and is either applied as fertilizer itself, or formed into other nitrogenous fertilizers. The nitric-acid nitric-oxide solution is prepared by combining the nitrogen oxides with water such as in a spray system or a bubbling system into which the nitrogen oxides are injected. At no time is it necessary to handle concentrated nitric acid or to store large amounts of nitric acid in this process. Although the solution is nitric acid and nitric oxides, it will hereinafter be referred to as a nitric acid solution.

One of the processes includes the step 22 of mixing the nitrogen oxides with water to obtain a dilute nitric acid. The alternate process includes the steps 24 of mixing nitrogen oxides into an aqueous solution and circulating the solution to fertilizer storage tank and back to increase its concentration and to form a salt solution which is less corrosive. Other processing steps are employed such as: (1) the step 21 of adding to the circulating flow in amounts to maintain a slightly acid solution; (2) the step 23 of adding fertilizer cations other than ammonia to make a desired fertilizer solution; or in some instances, (3) the step 25 of concentrating the acid solution.

The solution from step 14 may be used in any of several steps 16 such as those indicated at 26, 28 or 30 and the solutions formed by steps 21, 23 or 25 may be applied with conventional fertilizer application techniques as indicated at 31 to fertilize the farmlands.

Firstly, the dilute nitric acid may be applied directly to the farmland as a top dressing with the irrigation water, for example, at certain stages of growth of certain crops with beneficial effects as shown at step 26. Secondly, the nitric acid may be mixed within the irrigation water with ammonia to form ammonium nitrate which is applied to the farmland as shown in step 28. This step is preferred for crops which utilize ammonium and nitrate ions equally as it only requires sending one half of the ammonia nitrogen through the oxidizer. Thirdly, a cation such as potassium may be mixed with the nitric acid to form fertilizers which are especially useful for certain crops.

The process illustrated in FIG. 1 is economical and safe for several reasons such as: (1) it does not require storage of large amounts of gases, ammonia, nitric acid, nitrogen or the like; (2) it does not require storage of the fertilizer solution itself by a manufacturer prior to shipment to a number of different farms; (3) it does not require the expensive transportation of a finished fertilizer solution to farms; (4) it requires the farmer only to buy the relatively inexpensive ammonia or to utilize inexpensive processes forming nitrogen dioxide or of forming ammonia, which processes and materials are less expensive than the fertilizer itself; (5) it does not require storage of large quantities of fertilizer on the farm prior to use; (6) heat from exothermic reactions is easily and safely dissipated because the processes are small and continuous; and (7) the fertilizers can be manufactured and supplied in sufficient quantities when needed.

Figures 2, 3:
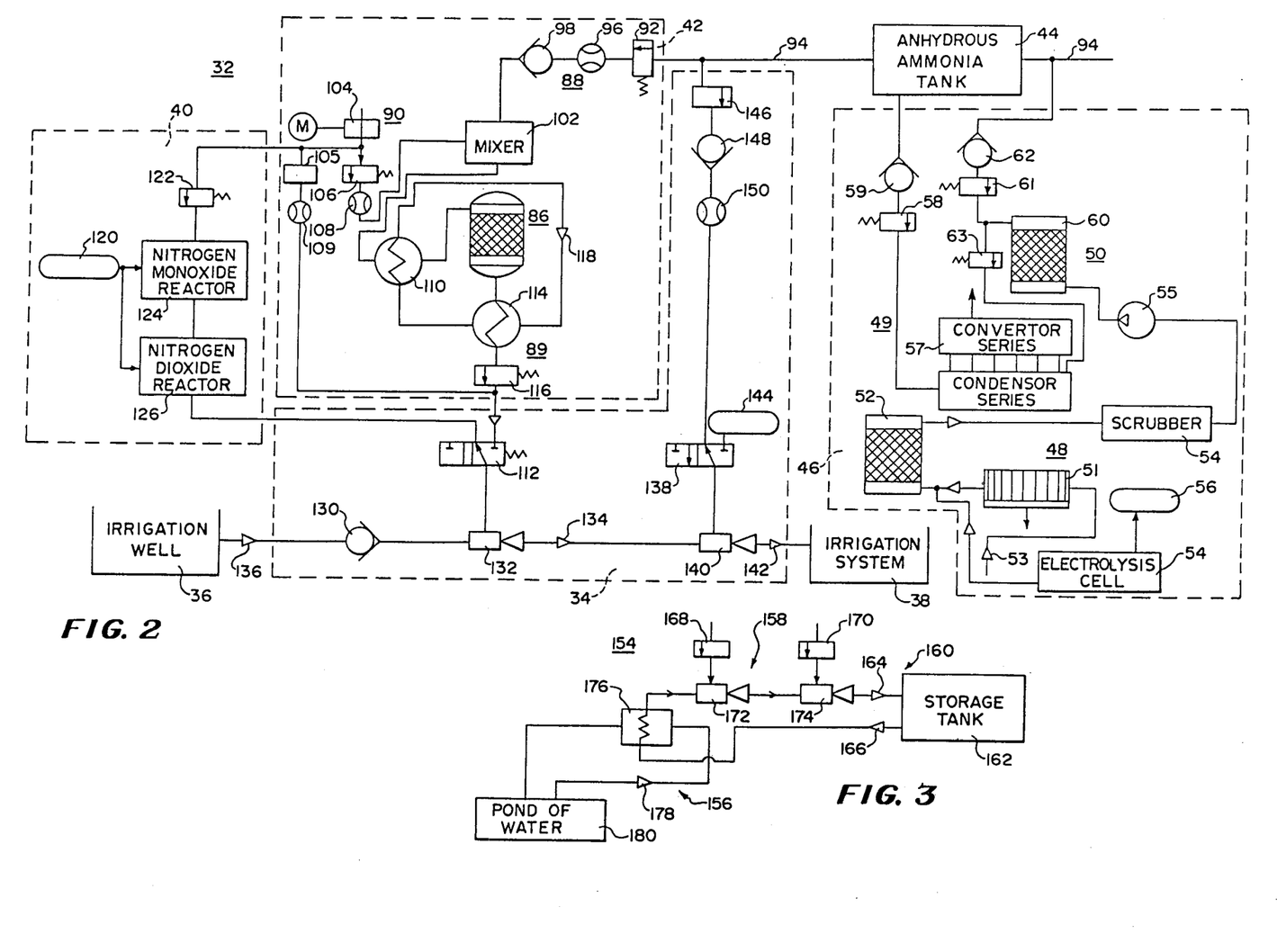
FIG. 2 is a graphic drawing of a portion of the system of FIG. 1.
FIG. 3 is a graphic drawing of another portion of the system of FIG. 1.

In FIG. 2, there is shown a system of nitrogenous fertilization 32 having a system 34 for preparing nitrogenous fertilizer, an irrigation well 36 and an irrigation system 38, with the inlet to the system 34 being connected to the outlet of the irrigation well 36 to receive water therefrom and the outlet of the system 34 being connected to the irrigation system 38 to apply the nitrogenous fertilizer through the irrigational system to the vegetation. Connected to the system 34 is a first system 40 and a second system 42 for preparing nitrogen oxides, with the system 42 being connected to an anhydrous ammonia tank 44, which communicates with a system 46 for preparing anhydrous ammonia.

In operation, the systems 40 or 42 prepare and supply nitrogen dioxide to the system 34 which prepares nitrogenous fertilizer and supplies the nitrogenous fertilizer to the irrigation system 38 with water from the irrigation well 36 in a continuous process. This continuous process avoids the necessity for storing large quantities of gases, ammonia, nitrogen, nitrogen dioxide or fertilizer or for transporting over long distances large amounts of fertilizer solutions thus reducing the cost of and facilitating nitrogenous fertilization and increasing its safety and availability. The nitrogen oxides are formed from air in the system 40 and from anhydrous ammonia in the system 42.

In the preferred embodiment, the nitrogen oxides are formed from anhydrous ammonia which is stored in the tank 44. The anhydrous ammonia is relatively inexpensive and may be purchased and shipped to the farm for processing and subsequent use or storage as a solution.

In the alternative, it may be prepared directly on the farm.

To prepare anhydrous ammonia on the farm, the system for preparing ammonia 46 includes a hydrogen-nitrogen-combination forming system 48, an anhydrous ammonia supply system 49 for on-line ammonia supply or ammonia accumulation.

To prepare a suitable hydrogen-nitrogen combination the hydrogen-nitrogen-combination forming system 48 includes an electrolysis cell 54, a filter 51, an oxygen burner 52, an air blower 53, an ethanolamine carbon dioxide scrubber 47, a compressor 55 and an oxygen storage tank 56.

The electrolysis cell 54 is a type known in the art and provides oxygen to the tank 56 and hydrogen to the burner 52 from the electrolysis of water, with the hydrogen being mixed with air from the blower 53 at the burner 52.

To provide the desired nitrogen-hydrogen mixture, the hydrogen-air mixture is passed through the oxygen burner 52 in the proper ratios. The outlet from the burner 52 is connected to the compressor 55 through the scrubber 47 which removes impurities.

The mixture of gases may be either converted to liquified anhydrous ammonia for storage in the tank 44 or the ammonia continuously passed through the tank and used in making solutions. In the alternative it may be passed directly to the line 94 through the valves 61 and 62. In the latter approach, measures must be taken to prevent waste of feed gases that are contained in the exit gas.

To supply anhydrous ammonia to the tank 44, the anhydrous ammonia supply system 49 includes a converter and condenser series 57, a valve 58 and a check valve 59 communicating in series in the order named between the outlet of the condenser series and the inlet of the anhydrous ammonia tank 44. A converter and condenser series are described in "Encyclopedia of Chemical Technology", ed. Kirk-Othmer, 1963, V. 2, Interscience Publisher, pages 259–289. A recirculating process is described in "Chemical Technology, Encyclopedia Treatment" by Van Toor, 1968, V. 1, Barnes and Noble, which may be adapted for use in the ammonia supply system in a manner known in the art. While operating, the converter and condenser series 57 provides ammonia to the anhydrous ammonia tank 44 through the valves 58 and 59. The first converter stage 60 of the converter series 57 is shown separately for convenience in explanation.

To provide gaseous ammonia to the conduit 94, the on-line gaseous ammonia supply system 50 includes the converter 60, a valve 61, and a check valve 62, communicating in series between the outlet of the compressor 55 and the conduit 94 in the order named. A second two-port valve 63 connects the first converter stage 60 to the first condenser stage and cooperates with the valve 61 to select and control the flow of ammonia through the two paths, one of which is to the line 94 and the other of which is to the ammonia tank 44.

To prepare nitrogen oxides from ammonia the system 42 includes a reactor 86, a system 88 for supplying anhydrous ammonia to the reactor 86, a system 90 for supplying air to the reactor 86 and bleach air to the reactor exit gases, and a system 89 for supplying nitrogen oxides and waste gases to the system 34 for preparing fertilizer from nitrogen oxides. The nitrogen oxides contain substantial amounts of nitrogen monoxide.

To apply controlled amounts of anhydrous ammonia to the mixer 102, a two-port, infinitely-variable, normally-closed valve 92 has its inlet port connected to the anhydrous ammonia tank 44 through a conduit 94 and its outlet connected to an inlet of the mixer 102 through a flow meter 96 and a check valve 98.

To apply air to the mixer 102, the system 90 includes an air blower 104 which communicates with the mixer 102 through a two-port, infinitely-variable, two-stage regulator valve 106 and a flow meter 108.

To apply bleach air to the reactor 86 exit gases the system 90 includes an air blower 104 which communicates with the exit gas conduit through a two-stage regulator valve 105 and a flow meter 109.

To preheat the gas mixture for application to the reactor 86, the mixture is flowed through a heat exchanger 110. To permit nitrogen oxides to flow from the reactor 86 into the system 34 for preparing fertilizer solutions, the outlet of the reactor 86 is connected to one of the inlets of the three-position, three-port valve 112 in the system 34 through a heat exchanger 114, a two-port, infinitely-variable, normally-closed, two-stage regulator valve 116 in series.

The reactor 86 includes a catalyst such as platinum which causes ammonia to be converted to nitrogen oxides when heated in the presence of air. To heat the ammonia and the air, the pump 118 pumps air through the heat exchanger 114 which cools the gases from the reactor 86. This air is passed through the heat exchanger 110 where it heats the air-ammonia mixture. The reactor 86 exit gas is hot because the reaction forming nitrogen oxides is exothermic. A starting heater is included within the mixer 102 but under normal circumstances is turned off once the reaction has started.

To convert air to nitrogen dioxide, the system 40 includes a two-port, infinitely-variable, normally-closed valve 122, a nitrogen monoxide reactor 124, and a nitrogen dioxide reactor 126. The inlet of the valve 122 is connected to the outlet of the air supply 104 to receive air under pressure which it applies to one inlet of the nitrogen monoxide reactor 124.

The nitrogen monoxide reactor 124 applies an electric arc to the materials entering it to create nitrogen monoxide from nitrogen and oxygen in the air. The nitrogen monoxide passes into the nitrogen dioxide reactor 126 which cools the nitrogen monoxide and receives oxygen from the air blower 104 on the tank 120 to form nitrogen dioxide which passes to another inlet of the valve 112 in the system 34.

To prepare dilute nitric acid, the system 34 includes the valve 112, a check valve 130 and an absorber 132. At least some of the water flowing from the irrigation well 36 to the irrigation system 38 is pumped by an irrigation pump 136 through the check valve 130 into the absorber 132 where the nitrogen dioxide from the valve 112 is injected under the water. The absorber 132 may include a water spray which is sprayed over a diffuser baffle with the nitrogen oxides being injected under the baffle. In any event, dilute nitric acid is formed and is available to the outlet of the absorber 132. This nitric acid may be pumped directly into the irrigation system 38 to be used as top dressing to fertilize certain crops. In the alternative, it may be combined with ammonia or other cations such as potassium compounds to form ammonium nitrate, potassium nitrate or other nitrogenous compounds to be pumped into the irrigation system as fertilizer.

The form of nitrogen in the fertilizer solution can be tailored to fit a specific crop's needs at this juncture. For example, if it is desired to have a 50:50 ammonium:nitrate ion ratio, neutralization is carried out with ammonia. If only nitrate is desired neutralization need not be carried out. Ratios of ammonium:nitrate other than above may be obtained simply by regulating the amount of ammonia used.

Less than a stoichiometric ratio of ammonium:nitrate ions may be obtained by adding a proportion of the stoichiometric amount of the ammonium ion equal to the desired ratio thus resulting in an acid solution.

Greater than a stoichiometric ratio of ammonium:nitrate ions may be obtained by adding a proportion of the stoichiometric amount of the ammonium ion equal to the desired ratio, thus resulting in a basic solution. Excess ammonia can be added to the point where the vapor pressure of the solution does not result in significant losses of ammonia nitrogen to the atmosphere or to the point where the deposits of calcium carbonate become excessive. Should it be desired to have a neutralized solution containing only nitrate nitrogen a non-nitrogenous cation such as potassium can be used at the neutralization step.

To prepare for example ammonium nitrate or potassium nitrate, the system 34 includes a three-way, three-port valve 138, a neutralizer 140, which is a jet mixer, and a pump 134. The three-way valve 138, either connects a source of ammonia or of a potassium compound to the neutralizer 140, the other inlet of the neutralizer 140 being connected to the outlet of the absorber 132 to receive the dilute nitric acid solution. The nitric acid reacts with ammonia to form ammonium nitrate or with the potassium compound to form potassium nitrate which is pumped by the pump 142 into the irrigation system 38 to be used as fertilizer. The neutralizer 140 may bubble the ammonia or potassium compound through the fluid from the absorber 132 or may use a spray system in which the nitric acid solution from the absorber 132 is sprayed over a potassium compound or ammonia diffuser.

To provide a potassium compound to the neutralizer 140, the system 34 includes a tank 144 connected to one inlet of the valve 138 for application of a solution of the potassium compound under pressure to the neutralizer 140. To provide ammonia to the neutralizer 140, the other inlet of the valve 138 is connected to the conduit 94 from the anhydrous ammonia tank 44 through a two-port, infinitely-variable, normally-closed valve 146, a check valve 148, and a flow meter 150 in series in the order named to meter the anhydrous ammonia into the neutralizer 140 where it may react with the dilute solution of nitric acid to form ammonium nitrate for application to the irrigation system.

Generally, this system of manufacturing and applying fertilizer is suitable for use in oxidizing between three hundred and three thousand five hundred pounds of nitrogen each day and is of greater economic value when it is desired to oxidize from 700 to 1200 pounds of nitrogen each day. Thus it is intended to oxidize between twelve and one half and one hundred forty six pounds of nitrogen each hour and works best in the range of thirty to fifty pounds each hour. It can be scaled down for experimentation. It is of such a size normally as to prepare an amount of nitrogen fertilizer that will provide between 30 to 50 pounds of fertilizer nitrogen in each acre-inch of irrigation water applied to a single field in the irrigation connected embodiment.

The solution when transferred on a continuous flow basis to an irrigation system is normally less than 5% nitrogen. It can use between five gallons and twenty gallons per minute of process water. When a preponderance of nitrate is fed to a crop with this system, the nitrogen concentration of chemical process water will normally be about 2%, although wide variations in fertilizer nitrogen strength can be achieved if desired.

In FIG. 3, there is shown a system 154 for concentrating and storing fertilizers in solution on the farm or in the vicinity of several farms such as at a rural fertilizer dealer's premises having a cooling system 156, a neutralizing system 158 and a circulating storage system 160. The circulating storage system 160 includes a storage tank 162 having first and second ports for receiving fluid and for permitting the exit of fluid so that fluid continually circulates through the tank, being pumped by any of several pumps such as 164 and 166.

The neutralizing system 158 includes first and second two-port, continuously-variable valves 168 and 170, an absorber 174, a neutralizer 172 and a heat exchanger 176. The first valve 170 controls the flow of nitrogen oxides into one port of the absorber 174, the other port accommodates the flow of fluid circulating through the storage tank 162 under pressure from the pump 164 so that the nitrogen oxides produced from the systems shown in FIG. 2 may be absorbed into the fluids circulating through the storage tank 162. The two-port, continuously-variable valve 168 controls application of ammonium or other fertilizer cations into one port of the neutralizer 172, the other neutralizer port accommodates the flow of the fluid circulating through the storage tank 162.

The heat exchanger 176 removes heat generated from neutralization of nitric acid with ammonia. It includes for this purpose a pump 178 which circulates water from a pond of water 180 on the farm through the heat exchanger 176 to cool the fluid circulating through the storage tank 162.

This arrangement may be used to form concentrated nitrogen solutions for immediate use or storage on the farm. By concentrating the solutions, they may be applied efficiently through conventional appication techniques and the preparation of the nitrogen oxides may be continued on a farm scale throughout the year and nevertheless result in concentrated nitrogen fertilization solutions at the proper time for application to the farmland in an economical manner.

By regulating the nature or amount of the cation introduced to the neutralizer 172 or by simply foregoing the neutralization step this arrangement may be used to control the ratio of nitrate to ammonium ions in the nitrogen solutions, as explained above. Process feedwater rates are adjusted in this embodiment to provide a non-pressure nitrogen solution containing from approximately 6% to 21% nitrogen. The concentration obtained depends on the planned use of the product and the operating flows are adjusted in accordance with the user's product desires.

Figure 4:
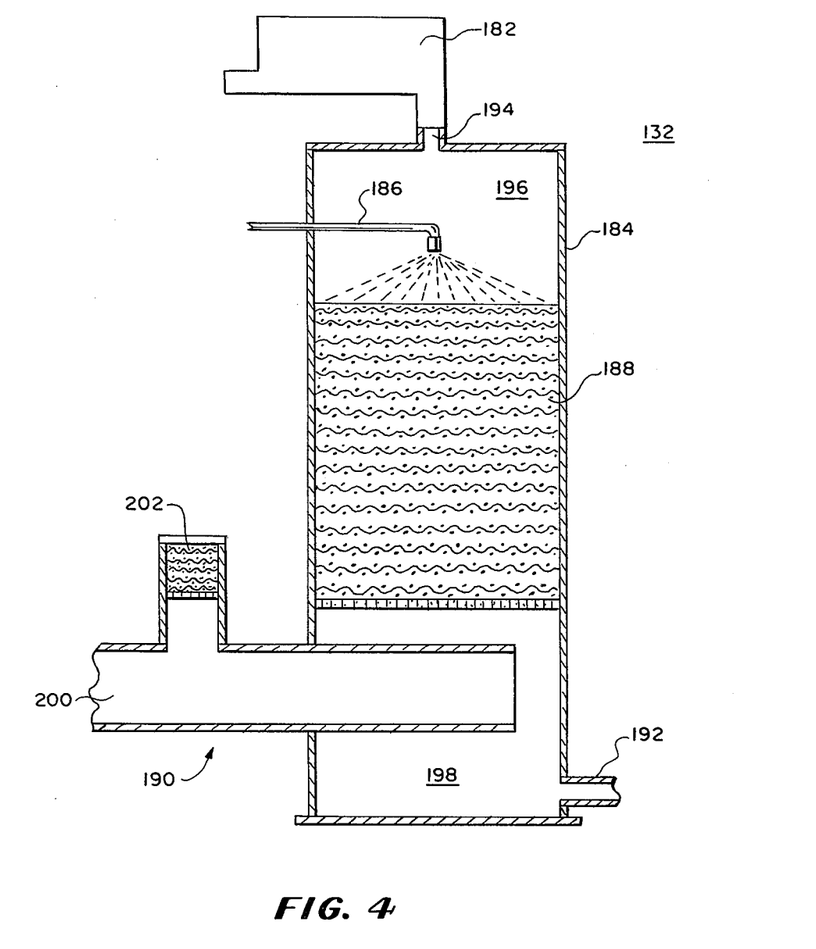
FIG. 4 is a simplified sectional view of a portion of the embodiment of FIGS. 1–3.

In FIG. 4 there is shown a simplified sectional view of the absorber 132 having a blower 182, an absorber column 184, a water distributor 186, surface catalyst packing 188, a gas inlet 190 and a nitric acid outlet 192.

The absorber column 184 has the blower 182 connected to its top to pull gases through a filter 194 and to exert a suction pressure on the system in cooperation with the pump 134 (FIG. 2). Below the filter 194 the column communicates with the water distributor 186 which applies water to the catalyst packing 188 in the center of the column. Below the catalyst packing 188 is the gas inlet 190 and at the bottom, the nitric acid outlet 192 for liquid nitric acid. The absorber column 184 is a hollow, vertical, cylindrical column between 5 feet high and 15 feet high, with a diameter of between nine inches and 18 inches. It is filled except for a space at the top and a space 198 at the bottom, with a solid catalyst packing 188 having surfaces with different attractions to nitrogen and oxygen such as an 8% nickel stainless steel mesh.

To mix the oxides and water, water flows into the top space from water distributor 186 which is connected to valve 130 (FIG. 2) at a range of rates of between 5 gallons for each minute and 20 gallons for each minute to provide an output of nitrogen fertilizer liquid. The oxides mixed with bleach air enter the bottom space 198.

The nitrogen oxides are attached to sites on the catalyst and oxidized to nitrogen dioxide by the air. The nitric oxide is held to the catalyst by forces sufficiently strong so it is not removed by the water and is oxidized in place to nitrogen dioxide. The nitrogen dioxide reacts with water to form nitric acid and is washed to the bottom of the column. A suitable catalyst is described in connection with a tail gas scrubber in U.S. Pat. No. 4,091,870 to Gilbert granted Apr. 26, 1977.

The gas inlet 190 receives nitrogen oxides at 200 which communicates with the valve 112 (FIG. 2) and air through the filter 202 which is adjusted to provide a molar ratio of oxygen to nitric oxides entering at 200 of at least 2 to 1 and probably will be adjusted, in most cases, in the preferred embodiment, to 5 to 1. The ratio will change depending on: (1) the geometry and size of the column; (2) the geometry, type of packing and amount of packing; and (3) the points of entry of air or other oxidant.

As can be understood from the above description, the system 32 for supplying nitrogenous fertilizer solutions to a field is inexpensive, safe and designed to interact efficiently with specific nutritional requirements of crops for several reasons, such as : (1) it does not require storage of large amounts of gases, ammonia, nitric acid, nitrogen or the like; (2) it does not require storage of fertilizer solution itself by a manufacturer prior to shipment to a number of different farms; (3) it does not require the expensive transportation of finished fertilizer to farms; (4) it requires the farmer only to buy the relatively inexpensive ammonia or to utilize inexpensvie processes forming nitrogen dioxide or of forming ammonia, which processes and materials are less expensive than the fertilizer itself; (5) it does not require storage of large quantities of fertilizer on the farm prior to use; (6) heat from exothermic reactions is easily and safely dissipated because the processes are small and continuous; (7) the fertilizers can be manufactured and supplied in sufficient quantities when needed; and (8) the ratio of nitrate to ammonium ions in the solution can be controlled to fit the needs of specific crops.

Although a preferred embodiment of the invention has been described with some particularity, many modifications and variations in the invention are possible in the light of the above teachings. It is therefore to be understood that, within the scope of the appended claims, the invention may be practiced other than as specifically described.

What is claimed is:

1. A method of nitrogenous fertilizing of a farm comprising the steps of:
    oxidizing between 12.5 pounds and 146 pounds of nitrogen each hour in a continuous process by burning ammonia;
    bringing the nitrogen oxides in contact with a surface catalyst and with flowing water at a rate in the range of five gallons per minute to twenty gallons per minute in a continuous process on a surface catalyst as the nitrogen oxides are being formed to form a dilute solution of nitric acid as the nitrogen oxides are formed; and
    using the dilute solution of nitric acid in a process leading to and including the application of nitrogenous fertilizer on a farm.

2. A method in accordance with claim 1 in which:
    the step of bringing the nitrogen oxides into contact with a catalyst and flowing water includes the step of drawing the water from an irrigation well located on the farm; and
    the step of preparing nitrogen oxides includes the step of passing ammonia and heated air through a catalytic converter.

3. A method according to claim 2 in which the step of using the nitric acid includes the steps of:
    mixing ammonia in a predetermined ratio with nitric acid to achieve a predetermined ratio of ammonia to nitrate ions; and
    applying the fertilizer to a crop species in which the predetermined ratio of ammonium to nitrate ions is suitable under the particular soil conditions present, whereby the growth of the species is facilitated.

4. A method according to claim 1 in which the step of using the dilute solution of nitric acid includes the steps of:
    recirculating water from a tank through a conduit and back into the same tank;
    forming substantial amounts of nitrogen dioxide on the farm while the water is circulating; and
    mixing the nitrogen dioxide as it is formed with the flowing water from the tank to form a dilute solution of nitric acid as the nitrogen dioxide is formed for later application to land.

5. A method in accordance with claim 4 in which the step of preparing nitrogen dioxide includes the step of passing ammonia and heated air through a catalytic converter.

6. A method according to claim 5 in which the step of using the nitric acid includes the steps of:
    mixing ammonia in a predetermined ratio with nitric acid to achieve a predetermined ratio of ammonium to nitrate ions; and
    applying the fertilizer to a crop species in which the predetermined ratio of ammonium to nitrate ions is suitable under the particular soil conditions present; whereby the growth of the species is facilitated.

* * * * *